(12) United States Patent
Bello et al.

(10) Patent No.: US 7,636,916 B2
(45) Date of Patent: Dec. 22, 2009

(54) SELF-OPTIMIZING WORKLOAD DISTRIBUTION AMONG VIRTUAL STORAGE CONTROLLERS

(75) Inventors: Keith A. Bello, Oro Valley, AZ (US); Dean L. Hanson, Tucson, AZ (US); Mark A. Reid, Castle Way, AZ (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 10/839,516

(22) Filed: May 5, 2004

(65) Prior Publication Data

US 2005/0251547 A1    Nov. 10, 2005

(51) Int. Cl.
G06F 9/46 (2006.01)
G06F 12/00 (2006.01)
G06F 15/16 (2006.01)

(52) U.S. Cl. .................. 718/104; 707/204; 709/200
(58) Field of Classification Search .......... 718/104; 707/204; 709/200
See application file for complete search history.

(56) References Cited

U.S. PATENT DOCUMENTS

| | | | |
|---|---|---|---|
| 5,440,686 A * | 8/1995 | Dahman et al. ............ 345/537 |
| 5,598,549 A | 1/1997 | Rathunde | |
| 6,003,044 A | 12/1999 | Pongracz et al. | |
| 6,249,849 B1 | 6/2001 | Day, III et al. | |
| 6,393,537 B1 | 5/2002 | Kern et al. | |
| 6,477,591 B1 | 11/2002 | VanderSpek | |
| 6,477,628 B1 | 11/2002 | Bish et al. | |
| 6,507,883 B1 | 1/2003 | Bello et al. | |
| 6,510,500 B2 | 1/2003 | Sarkar | |
| 6,526,418 B1 | 2/2003 | Midgley et al. | |
| 6,529,996 B1 | 3/2003 | Nguyen et al. | |
| 6,535,967 B1 | 3/2003 | Mililo et al. | |
| 7,401,124 B2 * | 7/2008 | Bello et al. ............... 709/213 |
| 2003/0004980 A1 * | 1/2003 | Kishi et al. ............... 707/204 |
| 2003/0014568 A1 | 1/2003 | Kishi et al. | |
| 2004/0246985 A1 * | 12/2004 | Kall et al. ............... 370/432 |

* cited by examiner

*Primary Examiner*—Meng-Ai An
*Assistant Examiner*—Kenneth Tang
(74) *Attorney, Agent, or Firm*—Dan Shifrin

(57) ABSTRACT

An increase in the efficiency of copy operations in a data storage system is provided. A host device directs that a volume of customer data be stored through one of two virtual storage servers on media in an associated library. An initiating controller queues a request to copy the volume to a second library. If the request is not processed by the initiating controller within a predetermined period, the initiating controller broadcasts the copy request to other controllers, each of which queues the request. After one of the controllers processes the request and the volume has been copied to the second library, the processing controller broadcasts a message to the other controllers which then dequeue the copy request from their respective copy queues. Upon receipt of such message, the initiating controller transmits a message to the host device that the volume was successfully stored and copied.

34 Claims, 4 Drawing Sheets

SELF-OPTIMIZING WORKLOAD DISTRIBUTION AMONG VIRTUAL STORAGE CONTROLLERS

TECHNICAL FIELD

The present invention relates generally to data storage systems and, in particular, to providing more efficient volume copy operations among virtual storage controllers.

BACKGROUND ART

High end storage controllers manage Input/Output (I/O) requests from networked hosts to one or more storage units, such as storage libraries. Storage controllers include one or more host bus adapters or interfaces to communicate with one or more hosts and adapters or interfaces to communicate with storage servers to which the storage units are attached. Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

In a Peer-to-Peer ("PtP") storage environment, two virtual storage servers, are each attached to a number (such as four or eight) virtual storage controllers. A host device is attached to each controller and each server is attached to a storage library. A library may include numerous storage drives, shelves for numerous data cartridges, and one or more accessor to transport requested cartridges between the shelves and the storage drives. The entire system appears to the host device as a single automated storage library. The present invention will be described herein in conjunction with data stored on magnetic tape media. Thus, "virtual storage controllers" and "virtual storage servers" may also be referred to herein as "virtual tape controllers" ("VTCs") and "virtual tape servers" ("VTSs"), respectively. However, the invention is not limited to use in a tape environment but may be implemented in other environments as well, such as magnetic disk storage and optical storage.

FIG. 1 is a block diagram of a typical data storage system 100 in which the present invention may be implemented. Each of several (typically four or eight) virtual tape controllers 110A, 110B, 110C and 110D, such as IBM® Model AXØ Virtual Tape Controllers, is attached to two virtual tape servers 120A and 120B, such as IBM 3494 Model Bxx Virtual Tape Servers. The first VTS 120A is attached to a first tape library 130A and the second VTS 120B is attached to a second tape library 130B. The libraries 130A and 130B may be IBM Model 3494 tape libraries. Each VTC 110A-D is also attached to a host device 140, such as an IBM System/390®.

The described configuration permits Peer-to-Peer copy operations. In the conventional method illustrated in FIG. 2, a volume of customer data 150 is transferred from the host 140 to one of the VTCs 110A (step 1) as part of a write request. The volume 150 is transferred to one of the VTSs 120A for ultimate storage on tape media in the associated library 130A (step 3). Additionally, the VTC 110A which received the host write request also issues a request to the second VTS 120B (step 4) to copy the volume 150 to media in the second library 130B (step 5). When operating in an immediate mode, the first VTC 110A waits until it is notified that the volume 150 has been copied to the second library 130B (step 6) before providing confirmation to the host 140 that the write request has been completed (step 7). In the deferred mode, the first VTC 110A may notify the host 140 that the write request has been completed before being notified that the volume 150 has been copied to the second library 130B. After the host 140 receives the 'complete' message from the VTC 110A, it is free to perform other operations, including further I/O operations.

In the illustrated conventional method, the host device 140 typically selects a VTC to handle a write operation substantially independently of the current workloads of the VTCs 110A-D. Because an AXØ VTC may only perform three simultaneous replication operations, it may have a substantial backlog in its work queue, such as 16 or 32 replications. Consequently, it may take a substantial amount of time before it is able to notify the host 140 that the operation is complete, thereby preventing the host 140 from performing other operations for the same period of time. Moreover, if another VTC has fewer jobs in its queue, it maybe idle while the first is working through its queue.

A similar issue arises if a particular VTC-VTS communications link is over-utilized with other host I/O operations. Such other operations may cause the copy requests in a queue to be delayed.

Consequently, a need exists for a more efficient method for distributing copy requests.

SUMMARY OF THE INVENTION

The present invention provides method, apparatus and program product to increase the efficiency of copy operations in a data storage system. Multiple virtual storage controllers are each in communication with a host device and to two virtual storage servers. Both virtual storage servers are attached to a respective automated storage library. Each controller includes a copy queue. After directing that a volume of customer data be stored through one of the servers on media in the associated library, an initiating controller queues in a copy queue a request to copy the volume to the other library. If the request is not processed by the initiating controller within a very short period, the initiating controller broadcasts the copy request to the other controllers. Preferably, the copy request is transmitted first from the initiating controller to a routing device in one of the servers which broadcasts the request to each other controller. The copy request is queued in a copy queue of each other controller. After one of the controllers processes the request and the volume has been copied to the second library, the processing controller broadcasts a message to the other controllers which then dequeue the copy request from their respective copy queues. Upon receipt of such message, the initiating controller transmits a message to the host device that the volume was successfully stored and copied.

In order to reduce the possibility that two or more controllers will attempt to process the copy request at substantially the same time, a delay is preferably imposed between the time the copy request is placed in each copy queue and the time when it may be processed by each controller. The delay may be predetermined for each controller or may be randomly generated with each copy request.

DETAILED DESCRIPTION OF THE PREFERRED EMBODIMENT

Figure 1:
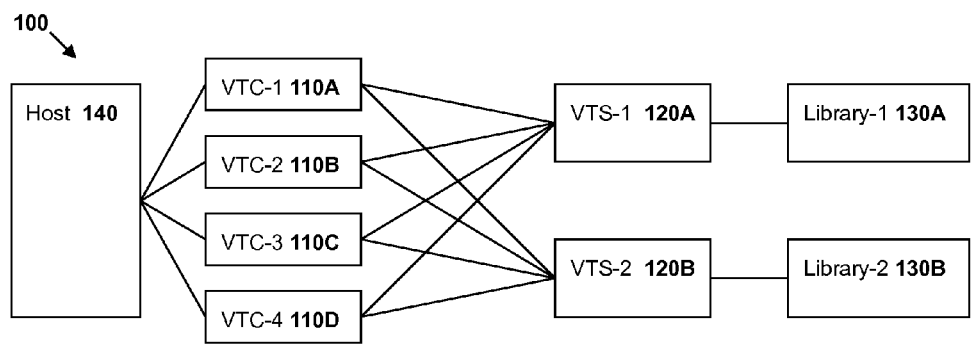
FIG. 1 is a block diagram of a data storage system in which the present invention may be implemented.
Figure 2:
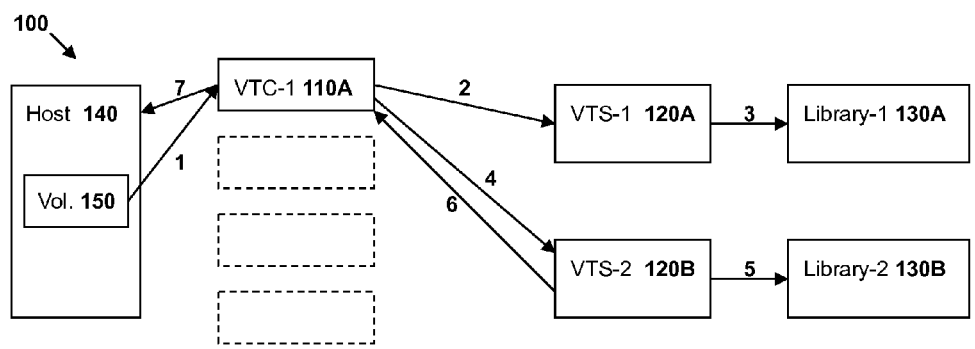
FIG. 2 is a block diagram illustrating a prior art method of processing copy requests in a data storage system.
Figure 3:
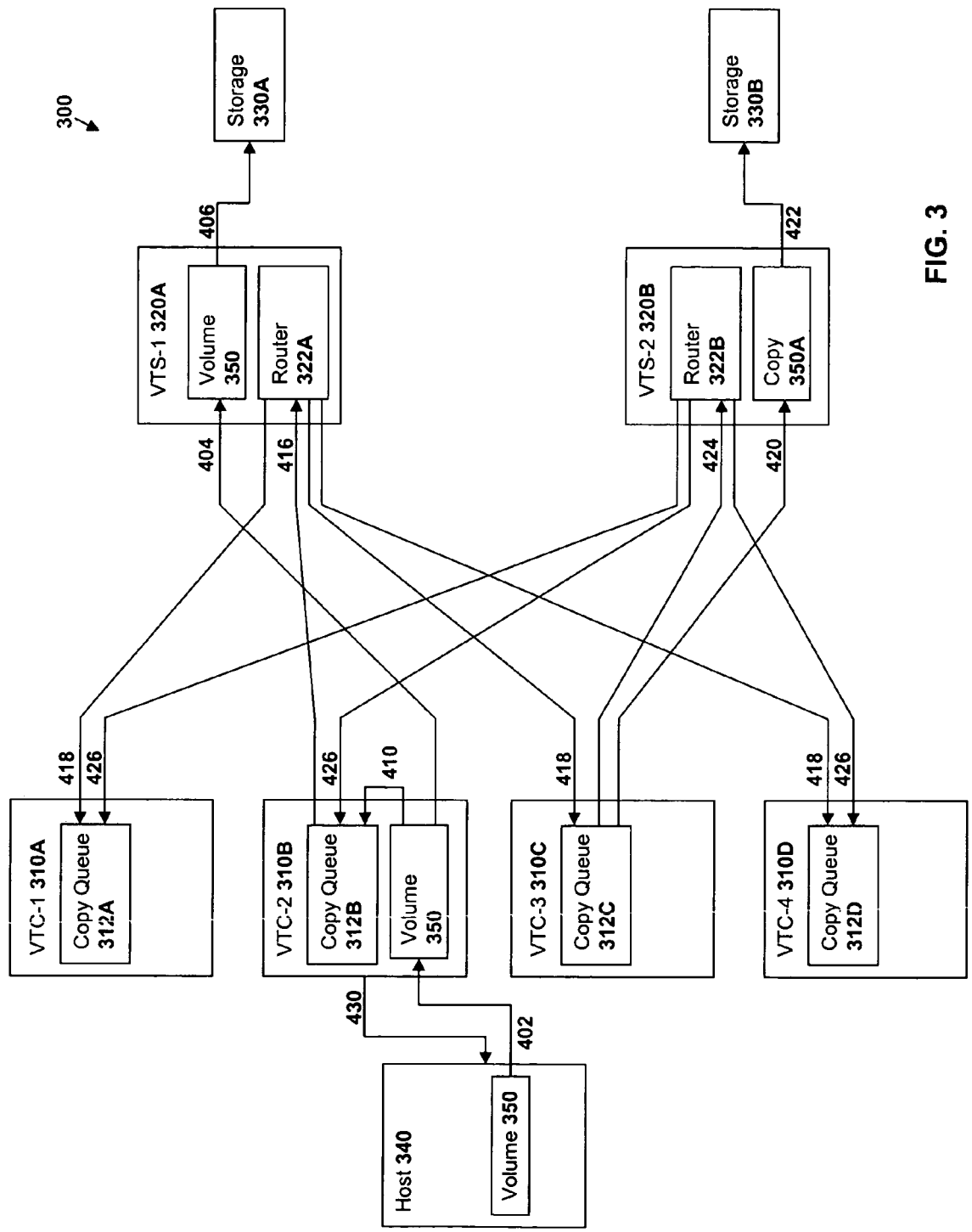
FIG. 3 is a block diagram illustrating a method of the present invention of processing copy requests in a data storage system.
Figure 4:
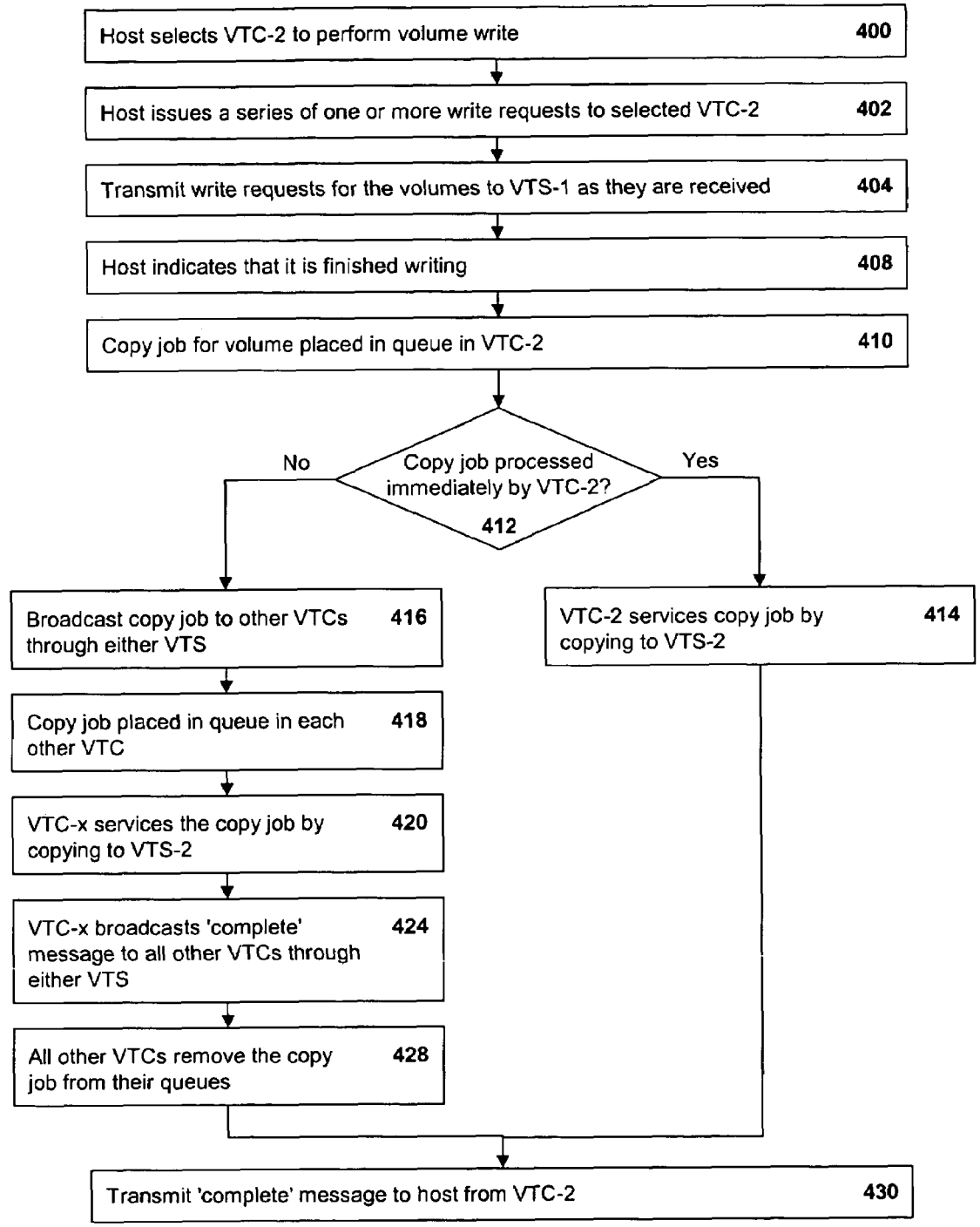
FIG. 4 is a flow chart of a method of the present invention.

Referring to the block diagram of FIG. 3 and the flow chart of FIG. 4, an implementation of the present invention will be described. The data storage system 300 includes a number (such as four or eight) virtual tape controllers 310A, 310B, 310C and 310D. Each controller 310A-D is attached through appropriate adapters and interfaces to two virtual tape servers 320A and 320B. The first server 320A is attached to a first automated storage library 330A the second server 320B is attached to a second automated storage library 330B. Each controller 310A-D is also attached through appropriate adapters and interfaces to a host device 340. Each controller 310A-D includes a copy queue 312A-D, respectively, and both servers 320A and 320B include a routing device 322A and 322B, respectively.

In operation, the host 340 selects one of the virtual controllers 310 (step 400) and issues a write request to store a volume 350 of customer data (step 402). In the illustrated example, the selected controller is the second controller 310B; however, as previously noted, any controller may be selected. The write request is transmitted from the selected virtual controller 310B to one of the two virtual servers (in the illustrated example, the write request is transmitted to the first server 320A) (step 404) which proceeds to store the volume in the associated library 330A (step 406). Upon completion of the host 340 issuing write requests to the controller 310B, the host issues a 'write complete' message (step 408). The selected controller 310B queues a request in its queue 312B to copy the volume through the second server 320B for storage in the associated library 330B (step 410).

If there are few jobs pending in the copy queue 312B of the second controller 310B (step 412), the request may be processed within a relatively short time, such as one second, by transmitting the copy request to the second server 320B (step 414). However, there may be more jobs pending in the queue for the second controller 310B to process this request immediately. Rather than allow the copy request to wait until it advances to the beginning of the queue (which may take several or more minutes), the second controller 310B broadcasts the copy request to the other controllers 310A, 310C and 310D (step 416). Preferably, the copy request is first transmitted to the router 322 in one of the servers 320; in the illustrated example, the routing device 322A in the first server 320A) is employed (step 416). The routing device 322A then broadcasts the copy request to all of the other controllers 310A, 310C and 310D and the copy request is queued in the copy queue 312A, C and D of each other controller 310A, C and D, respectively (step 418).

Eventually, the copy job will advance to the beginning of one of the copy queues 312A, B, C and D, including that of the originating controller 310B. In the illustrated example, the copy job is processed by the third controller 310C by transmitting a copy 350A of the volume to the second server 320B (step 420) which stores it on media in the second library 330B (step 422). The third controller 310C then broadcasts a 'complete' message to the other, non-processing controllers 310A, B and D (step 424). The 'complete' message is preferably transmitted first to the routing device of one of the servers (the routing device 322B of the second server 320B in FIG. 3) which broadcasts the message to the other controllers 310A, B and D (step 426). All of the other controllers 310A, B and D dequeue the copy job from their respective copy queues 312A, B and D (step 428). Moreover, upon receipt of the 'complete' message by the originating controller 310B (or upon the originating controller 310B processing the request), the originating controller 310B transmits a 'complete' message back to the host 340 (step 430).

It is possible for two or more of the controllers 310A-D to attempt to process the copy request at the same time. Consequently, it is preferable to impose a delay in each controller before the copy request may be processed. For example, each controller 310A-D may generate a random time delay to reduce the possibility of simultaneous processing. The delay may be generated from a conventional random number generator, may be generated based on the name of the volume being copied in combination with the unit number of the particular controller, may be randomly selected from a list of time units (such as 0, 1, 2, or 3 seconds), or may be generated from another suitable method. Another factor which may reduce the possibility of simultaneous processing is that the speed with which the controllers 310A-D retrieve messages, including copy requests, depends on the current workload of each. A controller may not be able to always immediately pause an operation to retrieve messages.

Figure 5:
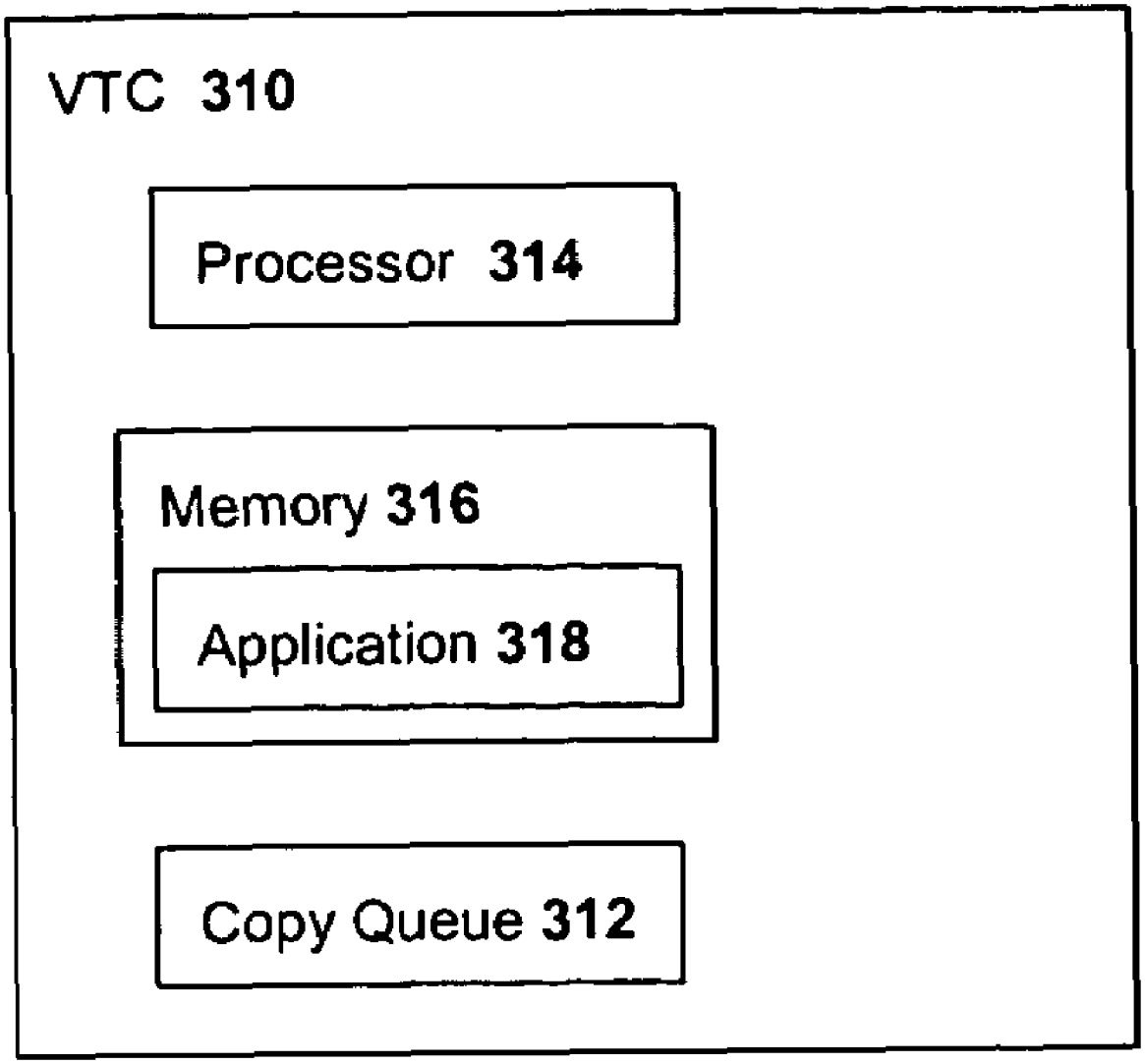
FIG. 5 is a block diagram of a virtual storage controller of the present invention.

FIG. 5 is a block diagram of a virtual tape controller 310 in which the present invention may be implemented. In addition to the copy queue 312, the controller 310 includes a processor 314 programmed to execute instructions embedded in computer-readable application code 318 stored in a memory 316.

The described techniques may be implemented as a method, apparatus or computer program product using standard programming and/or engineering techniques to produce software, firmware, hardware, or any combination thereof. The term "computer program product" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the article of manufacture may comprise any information bearing medium known in the art.

The illustrated logic of the FIGS. show certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for storing data in a data storage system having two virtual servers, a plurality of virtual controllers, each coupled to a host device and each virtual server, each virtual server being further coupled to one of two storage libraries, the method comprising:

receiving in a first virtual controller a write request from a host device to store a volume of data;

transmitting the volume from the first virtual controller to a first virtual server for storage in a first library;

queuing in a queue of the first virtual controller a request to copy the volume through the second virtual server to the second library;

if the copy request is not processed within a predetermined time by the first virtual controller:

broadcasting the copy request from the first virtual controller to each other virtual controller;

queuing the copy request in a copy queue in each other virtual controller;

preventing each virtual controller from attempting to process the copy request for a respective random period of delay;

when the copy request advances to the beginning of the copy queue of any one of the other virtual controllers, processing the copy request by the one virtual controller; and broadcasting a 'complete' message from the processing virtual controller which processed the copy request to each virtual controller that did not process the copy request; and transmitting a 'copy complete' message from the first virtual controller to the host device.

2. The method of claim 1, wherein broadcasting the copy request to each other virtual controller comprises:

transmitting a copy request from the first virtual controller to a routing device in one of the first and second virtual servers; and broadcasting the copy request from the routing device to each other virtual controller.

3. The method of claim 1, wherein broadcasting the 'complete' message to each virtual controller that did not process the copy request comprises:

transmitting the 'complete' message from the processing virtual controller to a routing device in one of the first and the second virtual servers; and broadcasting the 'complete' message from the routing device to each virtual controller that did not process the copy request.

4. The method of claim 1, wherein:

broadcasting the copy request to each other virtual controller comprises:

transmitting a copy request from the first virtual controller to a routing device in one of the first and second virtual servers; and broadcasting the copy request from the routing device to each other virtual controller; and broadcasting the 'complete' message to each virtual controller that did not process the copy request comprises:

transmitting the 'complete' message from the virtual controller that processed the copy request to a routing device in one of the first and the second virtual servers; and broadcasting the 'complete' message from the routing device to each virtual controller that did not process the copy request.

5. The method of claim 1, further comprising, following processing the copy request by the processing virtual controller, dequeuing the copy request from the queue of each virtual controller that did not process the copy request.

6. The method of claim 1, wherein each respective random period of delay is a delay randomly selected from a plurality of predetermined units of time.

7. The method of claim 1, wherein the predetermined time is approximately one second.

8. The method of claim 1, wherein the virtual controllers are virtual tape controllers and the virtual servers are virtual tape servers.

9. A data storage system, comprising:

a plurality of virtual controllers, each attached to a host device;

first and second virtual servers, each attached to each virtual controller;

first and second storage libraries attached to the first and second virtual servers, respectively;

means for receiving in a first virtual controller a write request from the host device to store a volume of data;

means for transmitting the volume from the first virtual controller to the first virtual server for storage in the first storage library;

means for queuing in a queue of the first virtual controller a request to copy the volume through the second virtual server to the second library;

means for preventing each virtual controller from attempting to process the copy request for a respective random period of delay;

means for broadcasting the copy request from the first virtual controller to each other virtual controller if the copy request is not processed by the first virtual controller within a predetermined period of time;

means for queuing the copy request in a queue of each other virtual controller;

means for processing the copy request by one of the virtual controllers when the copy request advances to the beginning of the copy queue of the processing virtual controller;

means for broadcasting a 'complete' message from the processing virtual controller to each virtual controller that did not process the copy request; and means for transmitting a 'copy complete' message from the first virtual controller to the host device.

10. The data storage system of claim 9, wherein:

the first and second virtual servers each include a routing device; and the means for broadcasting the copy request to each other virtual controller comprises:

means for transmitting a copy request from the first virtual controller to the routing device in one of the first and second virtual servers; and means for broadcasting the copy request from the routing device to each other virtual controller.

11. The data storage system of claim 9, wherein the means for broadcasting the 'complete' message to each virtual controller that did not process the copy request comprises:

means for transmitting the 'complete' message from the processing virtual controller to the routing device in one of the first and second virtual servers; and means for broadcasting the 'complete' message from the routing device to each virtual controller that did not process the copy request.

12. The data storage system of claim 9, wherein:

the first and second virtual servers each include a routing device;

the means for broadcasting the copy request to each other virtual controller comprises:

means for transmitting a copy request from the first virtual controller to the routing device in one of the first and second virtual servers; and means for broadcasting the copy request from the routing device to each other virtual controller; and the means for broadcasting the 'complete' message to each virtual controller that did not process the copy request comprises:

means for transmitting the 'complete' message from the processing virtual controller to the routing device in one of the first and second virtual servers; and means for broadcasting the 'complete' message from the routing device to each virtual controller that did not process the copy request.

13. The data storage system of claim 9, further comprising means for dequeuing the copy request from the queue of each virtual controller that did not process the copy request following processing the copy request by the processing virtual controller.

14. The data storage system of claim 9, wherein each respective random period of delay is a delay randomly selected from a plurality of predetermined units of time.

15. The data storage system of claim 9, wherein the predetermined time is approximately one second.

16. The data storage system of claim 9, wherein the virtual controllers are virtual tape controllers and the virtual servers are virtual tape servers.

17. A virtual storage controller, comprising:

a host adapter for connecting to a host device;

first and second adapters for connecting to first and second virtual storage servers, respectively, the first and second virtual servers being coupled to first and second storage libraries, respectively and being further coupled each of a plurality of other virtual storage controllers;

a copy queue for storing copy requests received from the host device; and a processor programmed to execute instructions for:

receiving a write request from the host device to store a volume of data;

transmitting the volume to the first virtual storage server for storage in the first library;

queuing in a copy queue of the virtual storage controller a request to copy the volume through the second virtual server to the second library;

if the copy request is not processed within a predetermined time by the virtual storage controller, broadcasting the copy request to each other virtual storage controller for queuing in a copy queue in each other virtual storage controller and for processing by one of the other virtual controllers;

preventing each other virtual controller from attempting to process the copy request for a respective random period of delay;

receiving a 'complete' message from the processing virtual storage controller broadcasting a 'complete' message from the processing virtual controller to each virtual controller that did not process the copy request; and transmitting a 'copy complete' message to the host device.

18. The virtual storage controller of claim 17, wherein:

the instructions for broadcasting the copy request to each other virtual controller comprise instructions for:

transmitting a copy request to a routing device in one of the first and second virtual servers; and broadcasting the copy request from the routing device to each other virtual controller; and the instructions for receiving the 'complete' message from the processing virtual controller comprise instructions for receiving the 'complete' message from a routing device in one of the first and the second virtual servers.

19. The virtual storage controller of claim 17, wherein the instructions further comprise instructions for dequeuing the copy request from the copy queue of each virtual controller that did not process the copy request following processing the copy request by the processing virtual controller.

20. The virtual storage controller of claim 17, wherein the predetermined time is approximately one second.

21. The virtual storage controller of claim 17, wherein the virtual storage controllers are virtual tape controllers and the virtual storage servers are virtual tape servers.

22. The virtual storage controller of claim 17, wherein each respective random period of delay is a delay randomly selected from a plurality of predetermined units of time.

23. A virtual storage controller, comprising:

a host adapter for connecting to a host device;

first and second adapters for connecting to first and second virtual storage servers, respectively, the first and second virtual servers being coupled to first and second storage libraries, respectively and being further coupled to each of a plurality of other virtual storage controllers including a first virtual storage controller;

a copy queue for storing copy requests; and a processor programmed to execute instructions for:

receiving a request from the host device to copy a volume from the first virtual storage controller through the second virtual server to the second library;

queuing the request in the copy queue;

delaying an attempt to process the copy request for a random period of delay;

if a 'complete' message is not received from another virtual storage controller:

processing the copy request;

broadcasting a 'complete' message to each other virtual storage controller;

processing the copy request after the random period of delay if a 'complete' message is not received from another virtual storage controller; and canceling the copy request and removing the copy request from the copy queue if a 'complete' message is received from another virtual storage controller during the period of random delay.

24. The virtual storage controller of claim 23, further comprising instructions for dequeuing the copy request from the copy queue following processing the copy request.

25. The virtual storage controller of claim 23, further comprising instructions to reduce the probability that the virtual storage controller will attempt to process the copy request substantially simultaneously with another virtual storage controller.

26. The virtual storage controller of claim 23, wherein the period of delay is randomly selected from a plurality of predetermined units of time.

27. The virtual storage controller of claim 23, wherein the virtual storage controllers are virtual tape controllers and the virtual storage servers are virtual tape servers.

28. A computer program product of a computer readable medium usable with a programmable computer, the computer program product having computer-readable code embodied therein for storing customer data and executable on a first of a plurality of virtual storage controllers, each virtual storage controller coupled to a host device and to first and second virtual storage servers, the computer-readable code comprising instructions for:

if a write request is received by the first virtual storage controller from the host device to store a volume of data:
  transmitting the volume from the first virtual controller to the first virtual storage server for storage in a first library;
  queuing in a queue in the first virtual storage controller a request to copy the volume through the second virtual server to the second library;
  if the copy request is not processed within a predetermined time by the first virtual storage controller:
   broadcasting the copy request from the first virtual controller to each other virtual storage controller, whereby the copy request is queued in a copy queue in each other virtual storage controller and processed by one of the other virtual controller;
   preventing each other virtual controller from attempting to process the copy request for a respective random period of delay; and
   receiving a 'complete' message from a second virtual storage controller which processed the copy request;
  if the copy request is processed within the predetermined time by the first virtual storage controller:
   transmitting the volume to the second virtual storage server for storage in a second library;
   broadcasting a 'complete' message to each other virtual storage controller whereby the copy request is removed from the copy queue in each other virtual storage controller; and
   transmitting a 'copy complete' message to the host device; and
 if a write request is received by the second virtual storage controller from the host device to store a volume of data:
  receiving a request to copy a volume from the second virtual storage controller through the second virtual server to the second library;
  queuing the copy request in the queue of the second virtual controller;
  preventing the second virtual controller from attempting to process the copy request for a random period of delay;
  if a 'complete' message is not received from another virtual storage controller during the random period of delay:
   processing the copy request by the second virtual controller; and
   broadcasting a 'complete' message from the second virtual controller to each other virtual storage controller.

29. The computer program product of claim 28, wherein:
the instructions for broadcasting the copy request to each other virtual storage controller comprise instructions for:
 transmitting a copy request from the first virtual storage controller to a routing device in one of the first and second virtual storage servers; and
 broadcasting the copy request from the routing device to each other virtual storage controller; and
the instructions for broadcasting the 'complete' message to each non-processing virtual storage controller comprise instructions for:
 transmitting the 'complete' message from the first virtual storage controller to a routing device in one of the first and the second virtual storage servers; and
 broadcasting the 'complete' message from the routing device to each other virtual storage controller.

30. The computer program product of claim 28, further comprising instructions for:
 if the copy request is not processed within a predetermined time by the first virtual storage controller, dequeuing the copy request from the queue of each non-processing virtual controller following receipt of the 'complete' message; and
 if a write request is received by the second virtual storage controller from the host device to store a volume of data, removing the copy request from the queue following the processing of the copy request.

31. The computer program product of claim 28, further comprising instructions for reducing the probability that the first virtual storage controller will attempt to process the copy request substantially simultaneously with another virtual storage controller if a request to copy the volume is received by the first virtual storage controller from the second virtual storage controller.

32. The computer program product of claim 28, wherein the period of delay is randomly selected from a plurality of predetermined units of time.

33. The computer program product of claim 28, wherein the virtual storage controllers are virtual tape controllers and the virtual storage servers are virtual tape servers.

34. The computer program product of claim 28, wherein the predetermined time is approximately one second.

* * * * *

UNITED STATES PATENT AND TRADEMARK OFFICE
CERTIFICATE OF CORRECTION

PATENT NO. : 7,636,916 B2 Page 1 of 1
APPLICATION NO. : 10/839516
DATED : December 22, 2009
INVENTOR(S) : Bello et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1631 days.

Signed and Sealed this

Ninth Day of November, 2010

David J. Kappos
*Director of the United States Patent and Trademark Office*